US009197791B2

(12) United States Patent
Lee et al.

(10) Patent No.: US 9,197,791 B2
(45) Date of Patent: Nov. 24, 2015

(54) DISPLAY DEVICE, DRIVING DEVICE FOR DISPLAY DEVICE, AND DRIVING METHOD THEREOF

(75) Inventors: Wook Lee, Yongin (KR); Jong-Woong Park, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 383 days.

(21) Appl. No.: 13/465,794

(22) Filed: May 7, 2012

(65) Prior Publication Data

US 2013/0113997 A1    May 9, 2013

(30) Foreign Application Priority Data

Nov. 9, 2011  (KR) .......................... 10-2011-0116586

(51) Int. Cl.
*H04N 5/21* (2006.01)
*H04N 5/70* (2006.01)
*G09G 3/30* (2006.01)
*G09G 3/32* (2006.01)
*H04N 5/14* (2006.01)

(52) U.S. Cl.
CPC ............. *H04N 5/142* (2013.01); *G09G 3/3233* (2013.01); *H04N 5/70* (2013.01); *G09G 2300/0452* (2013.01); *G09G 2310/0232* (2013.01); *G09G 2320/0242* (2013.01); *G09G 2320/0271* (2013.01)

(58) Field of Classification Search
USPC ................ 345/76–83, 87–104, 204, 690; 315/169.3
See application file for complete search history.

(56) References Cited

U.S. PATENT DOCUMENTS

| 4,500,914 A * | 2/1985 | Watanabe et al. ............. 348/280 |
| 2008/0012883 A1* | 1/2008 | Ohta et al. .................... 345/690 |
| 2008/0062158 A1* | 3/2008 | Willis ............................ 345/204 |
| 2009/0141010 A1* | 6/2009 | Liao et al. ..................... 345/205 |

FOREIGN PATENT DOCUMENTS

| KR | 10-2007-0019461 A | 2/2007 |
| KR | 10-2007-0033823 A | 3/2007 |
| KR | 10-2008-0033807 A | 4/2008 |
| KR | 10-2008-0099908 A | 11/2008 |

* cited by examiner

*Primary Examiner* — Charles V. Hicks
*Assistant Examiner* — Jeffrey S Steinberg
(74) *Attorney, Agent, or Firm* — Knobbe, Martens, Olson & Bear, LLP

(57) ABSTRACT

A display device is disclosed. The display device includes a first horizontal line having a first sequence of colored pixels, and a second horizontal line having a second sequence of colored pixels. The display device also includes a signal controller for detecting a first input video signal and a second input video signal for pixels respectively disposed on a left outermost vertical line and a right outermost vertical line of the display from an input video signal. The signal controller also corrects the first input video signal and the second input video signal so that they have grayscales that are less than a threshold value. The image quality characteristic is improved by removing the color shift phenomenon of the right and left outermost vertical lines in the display device.

14 Claims, 6 Drawing Sheets

FIG. 3

| R | G | B | G | R | G | B | G |
|---|---|---|---|---|---|---|---|
| B | G | R | G | B | G | R | G |
| R | G | B | G | R | G | B | G |
| B | G | R | G | B | G | R | G |

...

| R | G | B | G |
|---|---|---|---|
| B | G | R | G |
| R | G | B | G |
| B | G | R | G |

⋮ ⋱ ⋮

| R | G | B | G | R | G | B | G |
|---|---|---|---|---|---|---|---|
| B | G | R | G | B | G | R | G |

...

| R | G | B | G |
|---|---|---|---|
| B | G | R | G |

DISPLAY DEVICE, DRIVING DEVICE FOR DISPLAY DEVICE, AND DRIVING METHOD THEREOF

CROSS-REFERENCE TO RELATED APPLICATIONS

This application claims priority to and the benefit of Korean Patent Application No. 10-2011-0116586 filed in the Korean Intellectual Property Office on Nov. 9, 2011, the entire contents of which are incorporated herein by reference.

BACKGROUND

1. Field

The disclosed technology relates to a display device, a driving device and a method of driving the display device. More particularly, the disclosed technology relates to a display device in which a plurality of pixels are arranged in a pentile structure, and a driving device and a driving method thereof.

2. Description of the Related Technology

Recently, various flat panel displays having low weight and volume have been developed. Common types of flat panel displays include liquid crystal displays (LCD), field emission displays, plasma display panels (PDP), and organic light emitting diode (OLED) displays.

An organic light emitting diode (OLED) display uses an organic light emitting diode (OLED) for controlling luminance with current or voltage. The organic light emitting diode (OLED) includes an anode layer and a cathode layer for forming an electric field, and an organic light emitting material in the electric field for emitting light in response to the electric field.

As the resolution of the display device becomes greater, an aperture ratio of the display panel may be reduced, which causes the luminance of the device to be lower. To address this problem, a pixel structure following the pentile scheme of the liquid crystal display (LCD) has been developed. Korean Published Application 10-2008-0099908 describes a method for addressing a problem occurring on the line patterns and a massed color problem in the pixel structure according to the pentile method of the liquid crystal display (LCD).

Regarding the organic light emitting diode (OLED) display, the pentile-based pixel structure for disposing a green pixel between a red pixel and a blue pixel has also been developed. The pentile based pixel structure shows a reddish tinge on the left outermost vertical line and a greenish tinge on the right outermost vertical line, which is called a color shift. The above-noted color shift adversely affects image quality of the organic light emitting diode (OLED) display.

The above information disclosed in this Background section is only for enhancement of understanding of the background of the invention and therefore it may contain information that does not form the prior art that is already known in this country to a person of ordinary skill in the art.

SUMMARY OF CERTAIN INVENTIVE ASPECTS

One inventive aspect is a display device including a plurality of first horizontal lines, each including repeatedly disposed sets of pixels, each set including a red pixel, a green pixel, a blue pixel, and a green pixel, which are sequentially disposed, and a plurality of second horizontal lines, each including repeatedly disposed sets of pixels, each set including a blue pixel, a green pixel, a red pixel, and a green pixel, where the first and second horizontal lines are alternately arranged so as to be interleaved in a column direction. The display device also includes a signal controller configured to detect a first input video signal and a second input video signal for pixels respectively disposed on a left outermost vertical line and a right outermost vertical line of the display, and configured to correct the first input video signal and the second input video signal so that they have grayscales that are less respective threshold values to generate a video data signal, and a data driver configured to apply data voltages to the display according to the video data signal.

Another inventive aspect is a driving device for a display device including an edge detector for detecting a first input video signal and a second input video signal respectively corresponding to a left outermost vertical line and a right outermost vertical line of a display from an input video signal. The display device also includes a comparator for comparing grayscales of the first input video signal and the second input video signal with respective threshold values, a corrector for correcting an input video signal with a grayscale that is greater than the corresponding threshold value to be a corrected input video signal with a grayscale that is less than the threshold value, and a latch configured to generate a video data signal based on input video signals other than the first input video signal and the second input video signal received from the edge detector, the input video signal with a grayscale that is less than the threshold value received from the comparator, and the corrected input video signal received from the corrector.

Another inventive aspect is a method of driving a driving a display device. The display device includes a plurality of first horizontal lines, each including repeatedly disposed sets of pixels, each set including a red pixel, a green pixel, a blue pixel, and a green pixel, which are sequentially disposed, and a plurality of second horizontal lines, each including repeatedly disposed sets of pixels, each set including a blue pixel, a green pixel, a red pixel, and a green pixel, where the first and second horizontal lines are alternately arranged so as to be interleaved in a column direction. The method includes detecting a first input video signal and a second input video signal respectively corresponding to a left outermost vertical line and a right outermost vertical line of the display, comparing grayscales of each of the first input video signal and the second input video signal with respective threshold values, correcting the input video signal with a grayscale that is greater than the corresponding threshold value to be a corrected input video signal with a grayscale that is less than the threshold value, and generating a video data signal including the corrected input video signal.

BRIEF DESCRIPTION OF THE DRAWINGS

FIG. 3 shows a block diagram of a case in which a plurality of pixels according to an exemplary embodiment are arranged according to a pentile structure.

DETAILED DESCRIPTION OF CERTAIN INVENTIVE EMBODIMENTS

Figure 1:
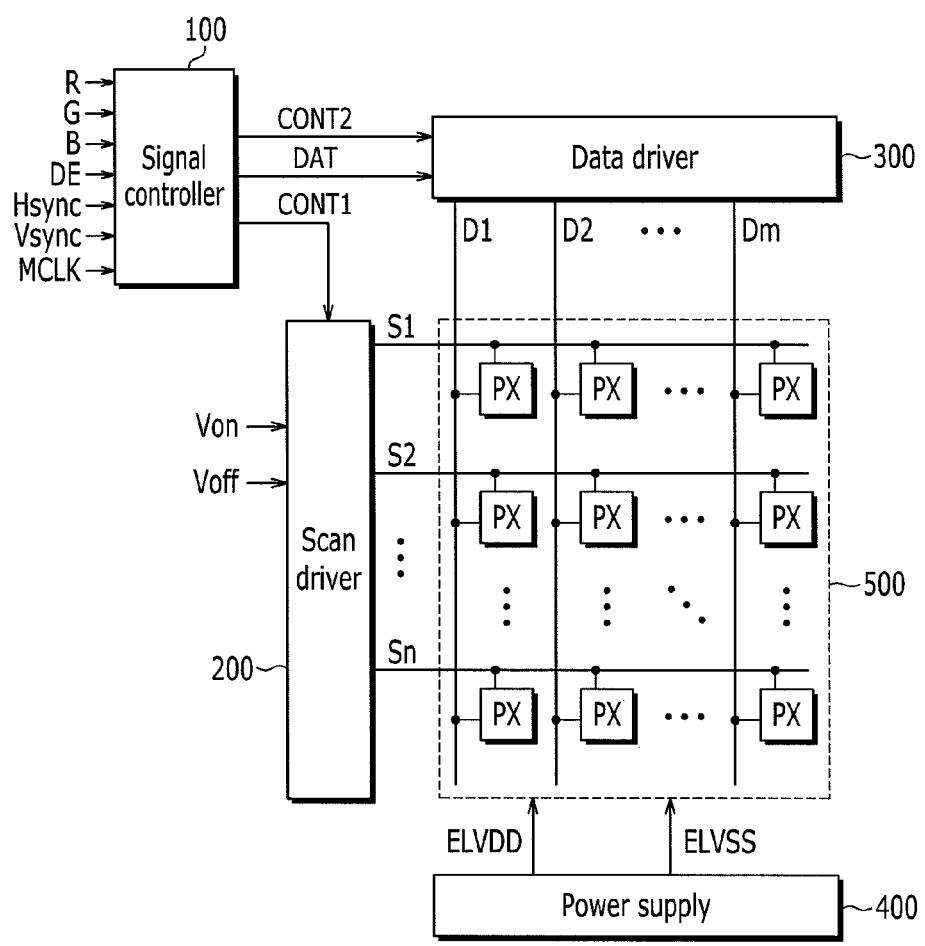
FIG. 1 shows a block diagram of a display device according to an exemplary embodiment.

Various embodiments are described more fully hereinafter with reference to the accompanying drawings, in which exemplary embodiments are shown. As those skilled in the art would realize, the described embodiments may be modified in various ways, without departing from the spirit or scope of the present invention. Further, the same constituent elements in exemplary embodiments are generally denoted by the same reference numerals and are described representatively in a first exemplary embodiment and generally only different configurations from the first exemplary embodiment are described in the other exemplary embodiments.

The drawings and description are to be regarded as illustrative in nature and not restrictive. Like reference numerals generally designate like elements throughout the specification. Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1 shows a block diagram of a display device according to an exemplary embodiment of the present invention. Referring to FIG. 1, the display device includes a signal controller 100, a scan driver 200, a data driver 300, a power supply 400, and a display 500.

The signal controller 100 receives video signals (RGB) provided by an external device and an input control signal for controlling the video signals (RGB). The video signals (RGB) include luminance information for each pixel (PX) and the luminance has a predetermined number (e.g., $1024=2^{10}$, $256=2^8$, or $64=2^6$) of gray levels. The input control signal includes a vertical synchronization signal (Vsync), a horizontal synchronization signal (Hsync), a main clock signal (MCLK), and a data enable signal (DE).

The signal controller 100 uses the input video signals (RGB) and the input control signal to process the input video signals (RGB) according to operational conditions of the display 500 and the data driver 300, and generates a scan control signal (CONT1), a data control signal (CONT2), and a video data signal (DAT). In detail, the signal controller 100 detects a first input video signal and a second input video signal to be input to pixels that are disposed on a left outermost vertical line and a right outermost vertical line of the display 500 in the input video signals (RGB)

The signal controller 100 corrects the first and second detected input video signals so that they may have grayscales that are less than a threshold value, and it thereby generates a video data signal (DAT). The signal controller 100 can correct either of the first input video signal and the second input video signal by multiplying the input video signal having a grayscale that is greater than the threshold value from among the first and second video signals by scaling factor, such as a reciprocal number of the threshold value.

The signal controller 100 transmits the scan control signal (CONT1) to the scan driver 200. The signal controller 100 transmits the data control signal (CONT2) and the video data signal (DAT) to the data driver 300.

The display 500 includes a plurality of scan lines S1-Sn, a plurality of data lines D1-Dm, and a plurality of pixels (PX) connected to a plurality of signal lines (S1-Sn, D1-Dm) and disposed in a matrix form. A plurality of scan lines S1-Sn are extended in a substantially row direction and are in parallel with each other, and a plurality of data lines D1-Dm are extended in a substantially column direction and are in parallel with each other.

The scan driver 200 is connected to the scan lines S1-Sn and applies a scan signal, a combination of a gate-on voltage (Von) and a gate-off voltage (Voff) to the scan lines S1-Sn according to the scan control signal (CONT1). The scan driver 200 can sequentially apply a scan signal with the gate on voltage (Von) to the scan lines S1-Sn.

The data driver 300 is connected to the data lines D1-Dm, and applies a data voltage (Vdat) to the display 500 according to the data control signal (CONT2). The data voltage (Vdat) can be selected according to the grayscale of the video data signal (DAT). When the scan driver 200 sequentially applies the scan signal with the gate on voltage (Von) to the scan lines S1-Sn, the data driver 300 applies the data voltage (Vdat) for the pixel (PX) on the horizontal line that corresponds to the scan line to which the gate on voltage (Von) is applied to the data lines D1-Dm.

The power supply 400 supplies a first power source voltage (ELVDD) and a second power source voltage (ELVSS) to the display 500.

The above-described driving devices (100, 200, 300, 400) are installed, for example, as at least one integrated circuit chip on the display 500 or a flexible printed circuit film, as a tape carrier package (TCP) on the display 500, on an additional printed circuit board (PCB), or on the display 500 together with the signal lines (S1-Sn, D1-Dm).

Figure 2:
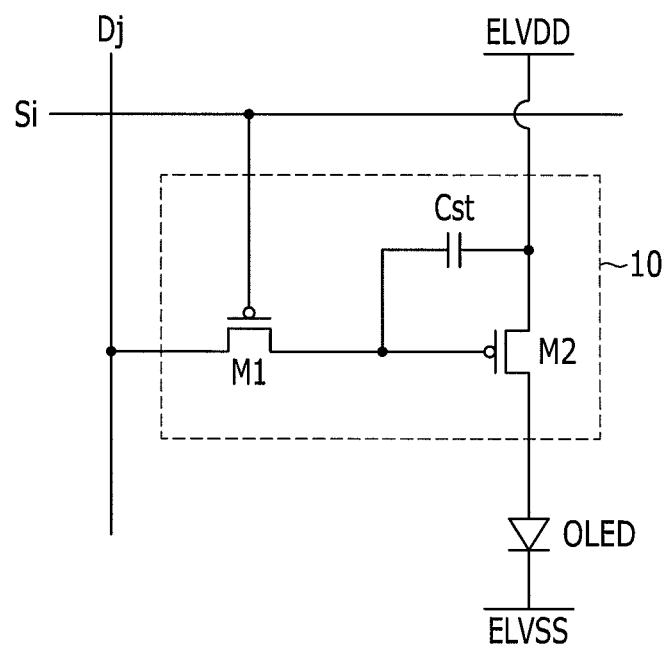
FIG. 2 shows a circuit diagram of a pixel.

FIG. 2 shows a circuit diagram of an embodiment of a pixel which can be used in the display device of FIG. 1. Referring to FIG. 2, a pixel (PX) of the organic light emitting diode (OLED) display includes an organic light emitting diode (OLED) and a pixel circuit 10 for controlling the organic light emitting diode (OLED). The pixel circuit 10 includes a switching transistor M1, a driving transistor M2, and a sustain capacitor Cst.

The switching transistor M1 includes a gate electrode connected to a scan line (Si), a first end connected to a data line (Dj), and a second end connected to a gate electrode of the connected driving transistor M2. The switching transistor M1 is turned on by the scan signal of the gate on voltage (Von) that is applied to the scan line (Si) to transmit the data voltage (Vdat) that is applied to the data line (Dj) to a gate electrode of the driving transistor M2.

The driving transistor M2 includes a gate electrode connected to the second end of the switching transistor M1, a first end for receiving the first power source voltage (ELVDD), and a second end connected to an anode of the organic light emitting diode (OLED). The driving transistor M2 controls a current volume flowing to the organic light emitting diode (OLED) according to the data voltage (Vdat) that is applied to the gate electrode.

The sustain capacitor Cst includes a first end connected to the gate electrode of the driving transistor M1 and a second end for receiving the first power source voltage (ELVDD). The sustain capacitor Cst charges the data voltage (Vdat) that is applied to the gate electrode of the driving transistor M2 and maintains the charging when the switching transistor M1 is turned off.

The organic light emitting diode (OLED) includes an anode connected to the second end of the driving transistor M2 and a cathode for receiving the second power source voltage (ELVSS). The organic light emitting diode (OLED) emits light of one of primary colors. An example of the primary colors will be red, green, and blue, and desired colors are displayed by a spatial or temporal sum of the primary colors.

The switching transistor M1 and the driving transistor M2 can be p-channel field effect transistors. In this instance, the gate on voltage for turning on the switching transistor M1 and the driving transistor M2 is a logic low level voltage and the gate off voltage for turning off the same is a logic high level voltage.

The p-channel field effect transistors are shown, and at least one of the switching transistor M1 and the driving transistor M2 can be an n-channel field effect transistor. In this instance, the gate on voltage for turning on the n-channel field effect transistor is a logic high level voltage and the gate off voltage for turning the same off is a logic low level voltage.

The scan driver 200 applies the gate on voltage (Von) to the scan line (Si) according to the scan control signal (CONT1) to turn on the switching transistor M1. In this instance, the data driver 300 applies the logic low level data voltage to the data line (Dj) according to the data control signal (CONT2). The sustain capacitor Cst is charged by the data voltage and the driving transistor M2 is turned on. A current corresponding to the data voltage flows to the organic light emitting diode (OLED) through the turned-on driving transistor M2. The organic light emitting diode (OLED) emits light corresponding to the current volume that flows through the driving transistor M2.

The pixel structure including two transistors and one capacitor has been described, and the display device according to an embodiment and the display device can use pixels with various structures which are different from the pixel shown in FIG. 2.

In some embodiments, a plurality of pixels each including an organic light emitting diode (OLED) for emitting light of one of red, green and blue are disposed as a pentile structure on the display. FIG. 3 shows a block diagram of a case in which a plurality of pixels according to an exemplary embodiment of the present invention are arranged according to a pentile structure.

Referring to FIG. 3, pixels including an organic light emitting diode (OLED) for emitting red light will be called red pixels (R), pixels including an organic light emitting diode (OLED) for emitting green light will be called green pixels (G), and pixels including an organic light emitting diode (OLED) for emitting blue light will be called blue pixels (B).

First horizontal lines and second horizontal lines are alternately arranged in a column direction on the display. In this instance, a red pixel (R), a green pixel (G), a blue pixel (B), and a green pixel (G) are sequentially and repeatedly arranged on the first horizontal line. A blue pixel (B), a green pixel (G), a red pixel (R), and a green pixel (G) are sequentially and repeatedly arranged on the second horizontal line. As shown, the red pixels (R) and the blue pixels (B) are repeatedly arranged on the vertical line at the left outermost of the display, and the green pixels (G) are arranged on the vertical line at the right outermost thereof.

When a color belonging to the category of the white is displayed on the pentile-based display, the left outermost vertical line has a reddish or purplish tinge and the right outermost vertical line has a greenish tinge. That is, when the white-related color is displayed, the color shift phenomenon for displaying the red and green tinges on the vertical lines at the right and left outermost of the display is generated to deteriorate the image quality characteristic.

Embodiments of the present invention improves the image quality characteristic by eliminating the color shift phenomenon of the right and left outermost vertical lines occurring when a plurality of pixels are arranged in the pentile structure in the described display. A driving device for a display device for eliminating the color shift phenomenon on the right and left outermost vertical lines occurring when a plurality of pixels are arranged in the pentile structure is now described.

Figure 4:
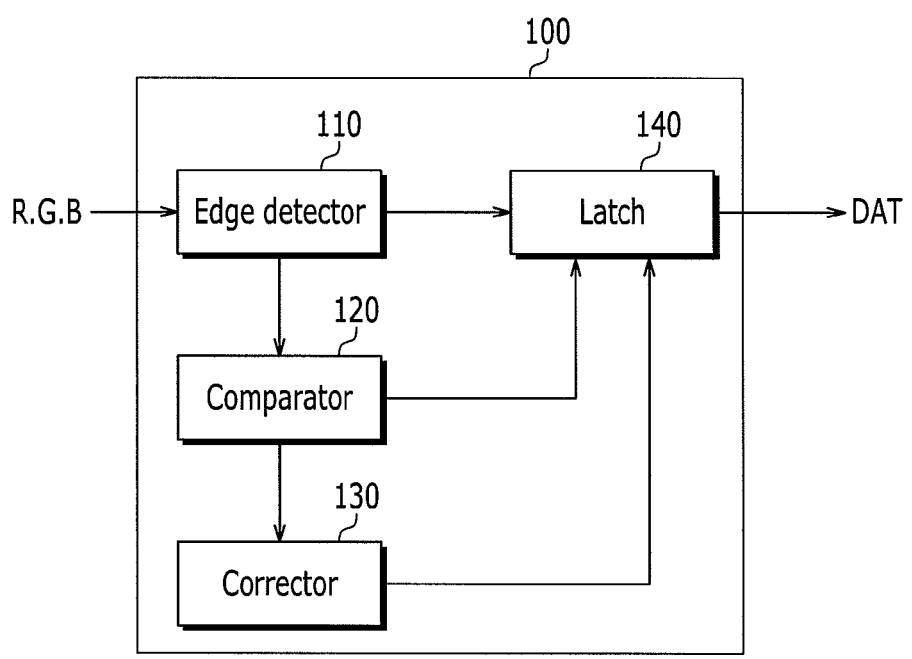
FIG. 4 shows a block diagram of a driving device for a display device according to an exemplary embodiment.

FIG. 4 shows a block diagram of a driving device for a display device according to an exemplary embodiment. Referring to FIG. 4, the driving device can be included in the signal controller 100 of the display device shown in FIG. 1. A driving device for a display device for removing the color shift phenomenon of the right and left outermost vertical lines will be assumed to be the signal controller 100.

The signal controller 100 includes an edge detector 110, a comparator 120, a corrector 130, and a latch 140. The input video signals (RGB) can be sequentially input to the edge detector 110 from the input video signal corresponding to the first horizontal line to the input video signal corresponding to the n-th horizontal line according to the method for driving the display device. The input video signals for a horizontal line can be sequentially input to the edge detector 110 from the input video signal corresponding to the left outermost pixel to the input video signal corresponding to the right outermost pixel.

The edge detector 110 detects a first input video signal and a second input video signal respectively corresponding to the left outermost vertical line and the right outermost vertical line of the display from the input video signals (RGB). The edge detector 110 can detect m input video signals to be applied to m pixels included in a horizontal line corresponding to a horizontal synchronization signal (Hsync). The m input video signals for the horizontal line are sequentially input so the edge detector 110 can detect the input video signal that is input for the first time and the input video signal that is input for the m-th time. The input video signal that is input first represents a first input video signal corresponding to the first pixel on the horizontal line, and the input video signal that is input for the m-th time represents the second input video signal corresponding to the m-th pixel.

The input video signals to be input to the first pixels on the n horizontal lines represent first input video signals that cause the color shift on the left outermost line, and the input video signals to be input to the m-th pixels represent second input video signals that cause the color shift on the right outermost line.

The edge detector 110 transmits the detected first and second input video signals to the comparator 120. The edge detector 110 transmits the input video signals other than the first and second input video signals to the latch 140.

The comparator 120 compares grayscales of the first input video signal and the second input video signal to a threshold value. The threshold value can be set to be a value for controlling the grayscales of the first input video signal and the second input video signal to be less than a predetermined level so as to prevent the color shift phenomenon of the right and left outermost lines. The threshold value can be experimentally determined according to the grayscale range applicable to the input video signals (RGB). For example, when the grayscale range of the input video signal (RGB) is $256=2^8$ and the color shift phenomenon occurs in the case in which the grayscale of the input video signal (RGB) is greater than the level of 120, the threshold value can be set, for example, to be equal to or less than 120.

The threshold value for the color shift phenomenon of the left outermost vertical line can be different from the threshold value for the color shift phenomenon of the right outermost vertical line, so the threshold value can be either of the first threshold value applicable to the first input video signal and the second threshold value applicable to the second input video signal.

The comparator 120 transmits an input video signal with a grayscale that is greater than the threshold value to the corrector 130. The comparator 120 transmits an input video signal with a grayscale that is less than the threshold value to the latch 140.

The corrector 130 corrects the input video signal with a grayscale that is greater than the threshold value to be a corrected input video signal with a grayscale that is less than the threshold value. The corrector 130 can, for example, generate a corrected input video signal by multiplying the input video signal with a grayscale that is greater than the threshold value by a reciprocal number of the threshold value. For example, when the threshold value is 110 and the gray level of the input video signal is 220, the grayscale of the corrected input video signal is 220×1/110=2. The corrector 130 transmits the corrected input video signal to the latch 140.

The latch 140 receives input video signals other than the first input video signal and the second input video signal from the edge detector 110, receives the input video signals with a grayscale that is less than the threshold value from the comparator 120, and receives the corrected input video signal from the corrector 130 to generate the video data signal (DAT). The latch 140 outputs the generated video data signal (DAT). In this instance, the latch 140 can output the video data signal (DAT) in the same order as the input video signals (RGB). For this purpose, the latch 140 adds the input video signal provided by the comparator 120 and the corrected input video signal provided by the corrector 130 to the right and left parts of the other input video signals provided by the edge detector 110 to generate the video data signal (DAT) in the same input order as the input video signals (RGB).

A method for driving a display device including a driving device for eliminating the color shift phenomenon of the right and left outermost lines is described with reference to FIG. 5 and FIG. 6.

Figure 5:
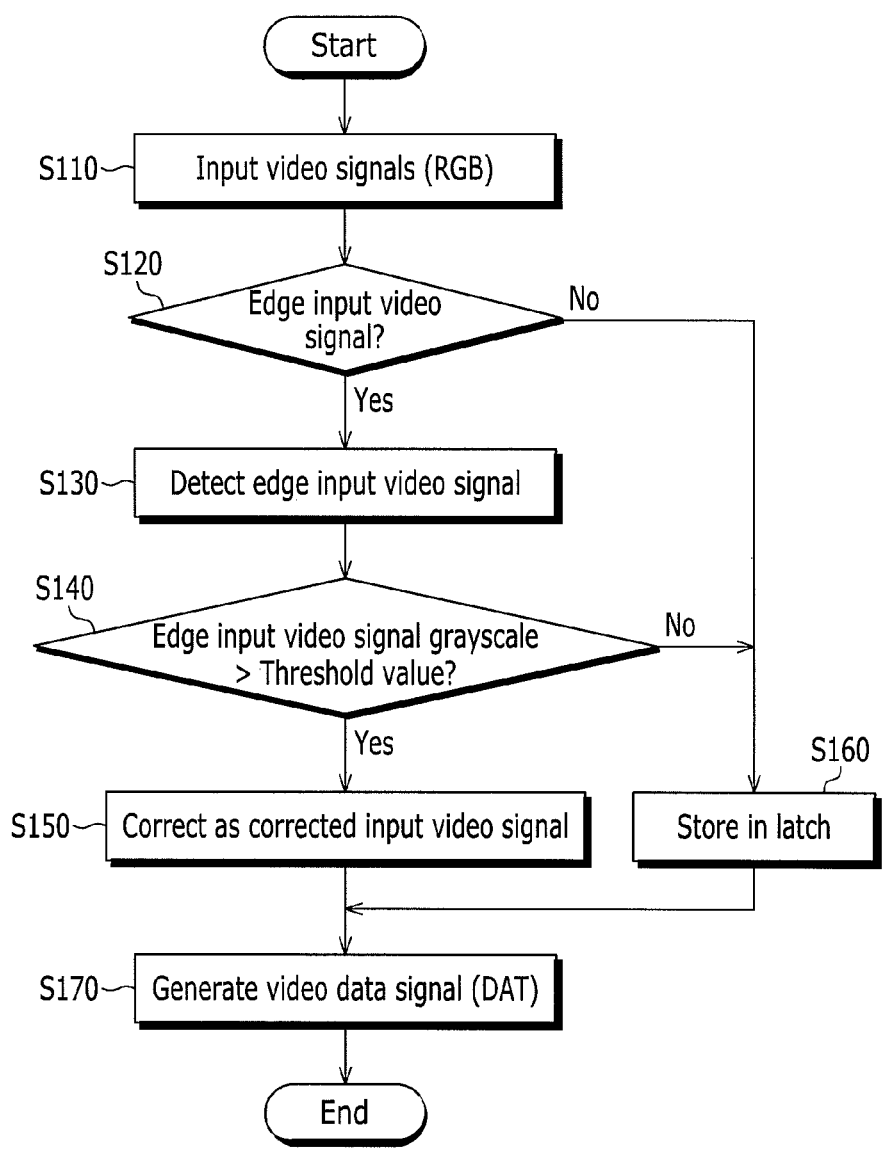
FIG. 5 shows a flowchart of a method for driving a display device including a driving device of FIG. 4 according to an exemplary embodiment.

FIG. 5 shows a flowchart of a method for driving a display device including a driving device of FIG. 4 according to an exemplary embodiment. FIG. 6 shows a process for generating a video data signal by processing an input video signal according to an exemplary embodiment of the present invention.

Figure 6:
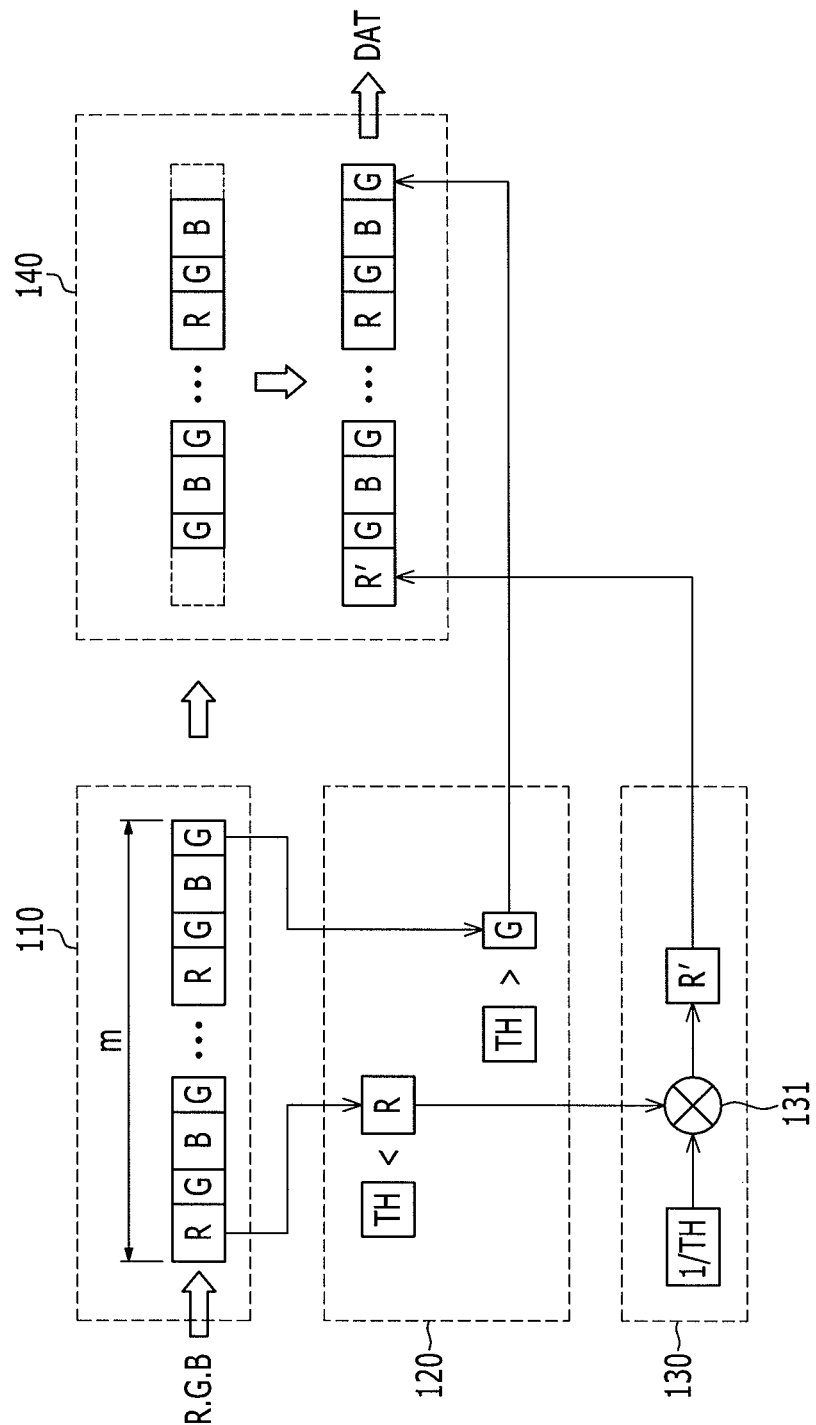
FIG. 6 shows a process for generating a video data signal by processing an input video signal according to an exemplary embodiment.

Referring to FIG. 5 and FIG. 6, input video signals (RGB) are input to the edge detector 110 (S110). The input video signals (RGB) from the input video signal corresponding to the first horizontal line to the input video signal corresponding to the n-th horizontal line can be sequentially input to the edge detector 110 according to the driving method of the display device. The input video signals for a horizontal line from the input video signal corresponding to the left outermost pixel to the input video signal corresponding to the right outermost pixel can be sequentially input to the edge detector 110. For example, as shown in FIG. 6, m input video signals (R, G, B, G, . . . , R, G, B, G) for one horizontal line can be sequentially input to the edge detector 110.

The edge detector 110 determines whether the input video signals that are sequentially input are the first input video signal and the second input video signal corresponding to the first pixel and the m-th pixel, that is, an edge of the horizontal line including m pixels (S120). The m input video signals for the horizontal line are sequentially input so the edge detector 110 can determine the input video signal that is input first from among the m input video signals as the first input video signal (R) corresponding to the first pixel of the horizontal line. The edge detector 110 can determine the input video signal (G) that is input for the m-th time to be the second input video signal (G) corresponding to the m-th pixel on the horizontal line.

The edge detector 110 sequentially transmits the input video signals other than the first input video signal (R) and the second input video signal (G) to the latch 140 so the latch 140 sequentially stores them (S160).

The edge detector 110 detects the first input video signal (R) and the second input video signal (G) corresponding to the edge of the horizontal line (S130). The edge detector 110 transmits the detected first input video signal (R) and the second input video signal (G) to the comparator 120.

The comparator 120 determines whether the grayscales of the first input video signal (R) and the second input video signal (G) corresponding to the edge of the horizontal line are greater than the threshold value (TH) (S140). That is, the comparator 120 determines whether the grayscale of the input video signal to be input to the first pixel and the m-th pixel is greater than the threshold value (TH). As an example, the grayscale of the first input video signal (R) may be greater than the threshold value (TH) and the grayscale of the second input video signal (G) may be less than the threshold value (TH). The comparator 120 transmits the second input video signal (G) with a gray scale that is less than the threshold value (TH) to the latch 140 so as to be stored therein (S160). The latch 140 adds the second input video signal (R) to the right (the position where the second input video signal (G) was to be stored when the input video signals are sequentially stored) of the sequentially stored input video signals (G, B, G, . . . , R, G, B).

The first input video signal (R) having a grayscale that is greater than the threshold value (TH) is transmitted to the corrector 130, and the corrector 130 corrects the first input video signal (R) into a corrected input video signal (R') with a grayscale that is less than the threshold value (TH) (S150). For example, the corrector 130 can generate a corrected edge signal (E1') by multiplying the first input video signal (R) by a scaling factor, such as the reciprocal number (1/TH) of the threshold value (TH) or such as the threshold value (TH) expressed as a fraction of the full scale gray level. The corrector 130 transmits the corrected input video signal (R') to the latch 140.

The latch 140 adds the corrected input video signal (R') to the left (the position where the first input video signal (R) is to be stored when the input video signals are sequentially stored) of the sequentially stored input video signals (G, B, G, . . . , R, G, B, G) to generate the video data signal (DAT) (S170). The video data signal (DAT) corresponds to a horizontal line. The latch 140 can output the generated video data signal (DAT) on the horizontal line in the same order as the input video signal (RGB).

As described above, the grayscales of the input video signals corresponding to the right and left outermost vertical lines are reduced to remove the color shift phenomenon displaying a reddish or purplish tinge and a greenish tinge in the display device in which a plurality of pixels are disposed according to the pentile structure thereby improving the image quality characteristic of the display device.

The drawings and detailed description herein are to be construed as merely illustrative and not a limitation of the scope of the present invention. For example, those skilled in the art can choose and replace various features described in the detailed description.

What is claimed is:

1. A display device comprising:
a display, comprising:
a plurality of first horizontal lines, each including repeatedly disposed sets of pixels, each set including a red pixel, a green pixel, a blue pixel, and a green pixel, which are sequentially disposed, and
a plurality of second horizontal lines, each including repeatedly disposed sets of pixels, each set including a blue pixel, a green pixel, a red pixel, and a green pixel, which are sequentially disposed,
wherein the first and second horizontal lines are alternately arranged so as to be interleaved in a column direction;
a signal controller configured to i) detect a first input video signal and a second input video signal for pixels respectively disposed on a left outermost vertical line and a right outermost vertical line of the display, ii) correct the first input video signal and the second input video signal so that they have grayscales that are less than respective threshold values and iii) combine the corrected video signals so as to form a video data signal; and
a data driver configured to apply data voltages to the display according to the video data signal.

2. The display device of claim 1, wherein the signal controller corrects either of the first input video signal and the second input video signal by multiplying the input video signal having a grayscale that is greater than the threshold value by a reciprocal number of the threshold value or by the threshold value expressed as a fraction of the full scale gray level.

3. The display device of claim 2, wherein the signal controller outputs the video data signal in the same input order as the input video signal.

4. The display device of claim 1, wherein each of a plurality of pixels included in the display include an organic light emitting diode (OLED).

5. A driving device for a display device comprising:
an edge detector for detecting a first input video signal and a second input video signal respectively corresponding to a left outermost vertical line and a right outermost vertical line of a display from an input video signal;
a comparator for comparing grayscales of the first input video signal and the second input video signal with respective threshold values;
a corrector for correcting an input video signal with a grayscale that is greater than the corresponding threshold value to be a corrected input video signal with a grayscale that is less than the threshold value; and
a latch configured to generate a video data signal based on i) input video signals other than the first input video signal and the second input video signal received from the edge detector, ii) the input video signal with a grayscale that is less than the threshold value received from the comparator, and iii) the corrected input video signal received from the corrector.

6. The driving device of claim 5, wherein the display comprises:
a plurality of first horizontal lines, each including repeatedly disposed sets of pixels, each set including a red pixel, a green pixel, a blue pixel, and a green pixel, which are sequentially disposed, and
a plurality of second horizontal lines, each including repeatedly disposed sets of pixels, each set including a blue pixel, a green pixel, a red pixel, and a green pixel, which are sequentially disposed,
wherein the first and second horizontal lines are alternately arranged so as to be interleaved in a column direction.

7. The driving device of claim 5, wherein the corrector generates the corrected input video signal by multiplying the input video signal with a grayscale that is greater than the threshold value by a reciprocal number of the threshold value or by the threshold value expressed as a fraction of the full scale gray level.

8. The driving device of claim 5, wherein the latch outputs the video data signal in the same order as the input order of the input video signals.

9. A method of driving a driving a display device, the display device including a plurality of first horizontal lines, each including repeatedly disposed sets of pixels, each set including a red pixel, a green pixel, a blue pixel, and a green pixel, which are sequentially disposed, and a plurality of second horizontal lines, each including repeatedly disposed sets of pixels, each set including a blue pixel, a green pixel, a red pixel, and a green pixel, which are sequentially disposed, wherein the first and second horizontal lines are alternately arranged so as to be interleaved in a column direction, the method comprising:
detecting a first input video signal and a second input video signal respectively corresponding to a left outermost vertical line and a right outermost vertical line of the display;
comparing grayscales of each of the first input video signal and the second input video signal with respective threshold values;
correcting the input video signal with a grayscale that is greater than the corresponding threshold value to be a corrected input video signal with a grayscale that is less than the threshold value; and
generating a video data signal including the corrected input video signal.

10. The method of claim 9, wherein the correcting includes generating the corrected input video signal by multiplying the input video signal with a grayscale that is greater than the threshold value by a reciprocal number of the threshold value or by the threshold value expressed as a fraction of the full scale gray level.

11. The method of claim 9, further including storing input video signals other than the first input video signal and the second input video signal.

12. The method of claim 11, further including storing the input video signal with a grayscale that is less than the threshold value.

13. The method of claim 12, wherein the generating of a video data signal includes generating the video data signal by combining an input video signal with a grayscale that is less than the threshold value with the corrected input video signal and the input video signals other than the first input video signal and the second input video signal.

14. The driving device of claim 5, wherein the corrector is configured to receive the grayscales of the first and second input video signals that are greater than the respective threshold values and correct the received grayscales to generate the corrected input video signal.

* * * * *